Patented Aug. 23, 1949

2,479,690

UNITED STATES PATENT OFFICE 2,479,690

3-CARBAMYL-2-PIPERIDONE

Glen H. Morey, Terre Haute, Ind., assignor to Commercial Solvents Corporation, Terre Haute, Ind., a corporation of Maryland No Drawing. Application March 5, 1945,
Serial No. 581,181

1 Claim. (Cl. 260—294)

This invention relates to a new and useful compound 3-carbamyl-2-piperidone and to a method for preparing it. More particularly it relates to the compound having the following general formula:

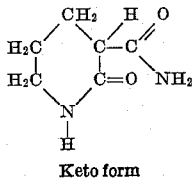

Keto form

This compound is prepared according to my invention by the catalytic liquid phase hydrogenation of dialkyl (cyanoethyl) malonates in the presence of ammonia.

In carrying out my invention I hydrogenate catalytically a mixture of a (cyanoethyl) malonic ester and ammonia in a liquid medium in the presence, for example, of an inert liquid which is at least to some extent a mutual solvent for the reacting components, for example, alcohols such as methanol, ethanol, etc. or 1,4-dioxane and the like or hydrocarbons such as cyclohexane, methylcyclohexane, or merely in the presence of an excess of liquid ammonia. Any suitable hydrogenation catalyst may be used, for example, Raney nickel, palladium charcoal, colloidal platinum and the like.

Hydrogen is passed into the mixture of (cyanoethyl) malonic ester, ammonia, solvent and catalyst at elevated pressures, for example, up to about 1,000 lbs. per square inch and the temperature is raised to promote reaction—usually temperatures of 150° C. or less being sufficient. After hydrogen absorption ceases, the charge is removed, the charge separated from the catalyst as by filtration, and the inert solvent removed as by evaporation. The product is a crystalline solid.

It was somewhat surprising that the hydrogenation treatment of the (cyanoethyl) malonic esters in the presence of ammonia should result in ring closure, and it might equally have been expected that an open chain compound such as α-(γ-aminopropyl) malonamide might have been obtained.

The new product of my invention may exist in the keto or enol form and in the enol form has a structure somewhat related to nicotinamide. My new product is useful in medicinal preparations and has marked bacteriostatic properties against the organism Staphylococcus aureus.

The following specific example will further illustrate my invention.

Example I

A mixture was made of 202 parts by weight of (cyanoethyl) malonic diethyl ester, 200 parts by volume of methanol and 100 parts by volume of liquid ammonia, and placed in a pressure vessel, together with 20 parts of Raney nickel catalyst. Hydrogen was passed through the mixture at a pressure of 1,000 lbs. per square inch, and the temperature was raised to 125° C. After hydrogen absorption ceased the hydrogenation was discontinued, the vessel opened, the material heated to dissolve some crystals which had formed, and the charge was filtered to remove the catalyst. The filtrate was cooled to room temperature whereupon crystals separated and were recovered. Additional crystals were obtained upon partial evaporation of the methanol. The combined crystals were dried and weighed amounting to 55 parts, corresponding to a yield of 40%. The crystals were analyzed for nitrogen and found to contain 19.81% nitrogen as compared to 19.71% theoretical value for the ring compound 3-carbamyl-2-piperidone.

Having described my invention, what is claimed is:

As a new composition of matter 3-carbamyl-2-piperidone.

GLEN H. MOREY.

REFERENCES CITED

The following references are of record in the file of this patent:

UNITED STATES PATENTS

| Number | Name | Date |
|---|---|---|
| 2,160,578 | Schmidt | May 30, 1939 |
| 2,167,351 | Eisleb | July 25, 1939 |

OTHER REFERENCES

Koelsch, J. Am. Chem. Soc., vol. 65 (Dec. 1943), pp. 2458–2459; 2093–2095.

Fieser et al., "Organic Chemistry" (D. C. Heath & Co., Boston, 1944), pp. 183 and 242.